Dec. 27, 1966   J. R. ZENTKO   3,294,010

SELF-ENERGIZING GRILL AND GENERATOR THEREFOR

Filed Oct. 17, 1963

INVENTOR.
JOSEPH R. ZENTKO
BY
*Francis J. Klempay*
ATTORNEY

United States Patent Office 3,294,010
Patented Dec. 27, 1966

3,294,010
SELF-ENERGIZING GRILL AND GENERATOR
THEREFOR
Joseph R. Zentko, 3407 South Ave.,
Youngstown, Ohio 44509
Filed Oct. 17, 1963, Ser. No. 317,007
2 Claims. (Cl. 99—421)

This invention relates to a portable grill or barbecue having a rotary spit and more particularly to such a device which is self-energizing so that the same is truly portable in the sense that it may be used at locations remote from commercial or other power sources. In accordance with this prime object of the invention, I provide the combination, in a practical and inexpensive assembly, of a thermoelectric generator for powering a specially selected electric motor for rotating the spit through reduction gearing.

A further object of the invention is the provision of a simplified and improved thermoelectric generator assembly which is specially applicable for use in a portable self-contained grill or barbecue having a driven rotary spit. To this end, the invention provides an exceedingly simple and inexpensive multiple thermocouple assembly which is supported in integral relation with the basket or support for the glowing charcoal in the normal use of the equipment.

A more specific object of the invention is the provision of an improved yet inexpensive mechanical assembly of a fire basket or support in a portable grill or barbecue in which is incorporated a thermoelectric generator for powering the electric motor connected to drive the rotary spit of the equipment through reduction gearing.

The above and other objects and advantages of the invention will become apparent upon consideration of the following specification and the accompanying drawing wherein there is disclosed a preferred embodiment of the invention.

Figure 1:
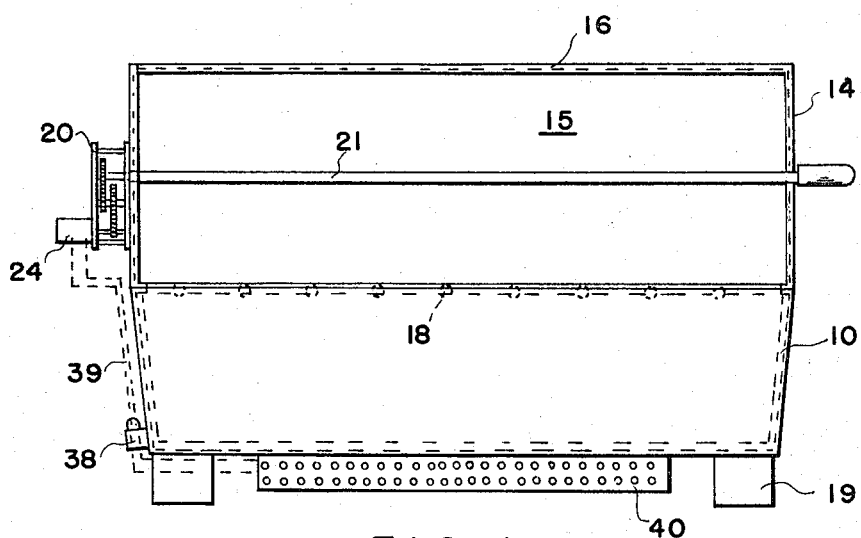
FIGURE 1 is a front elevation of a portable self-contained and self-energizing grill constructed in accordance with the principles of my invention.

In the drawing, reference numeral 10 designates a deep sheet metal pan or tray having a bottom wall 11 and four side walls which are sloped inwardly toward each other in a downward direction. The upper edges of the side walls of the tray 10 are flanged inwardly as shown at 12, and overlying the flanges on the rear and side walls of the member 10 are the inturned flanges 13 of an upper hood or cover of the grill assembly. This upper hood is comprised of side walls 14, a rear wall 15, and a top panel 16.

Figure 3:
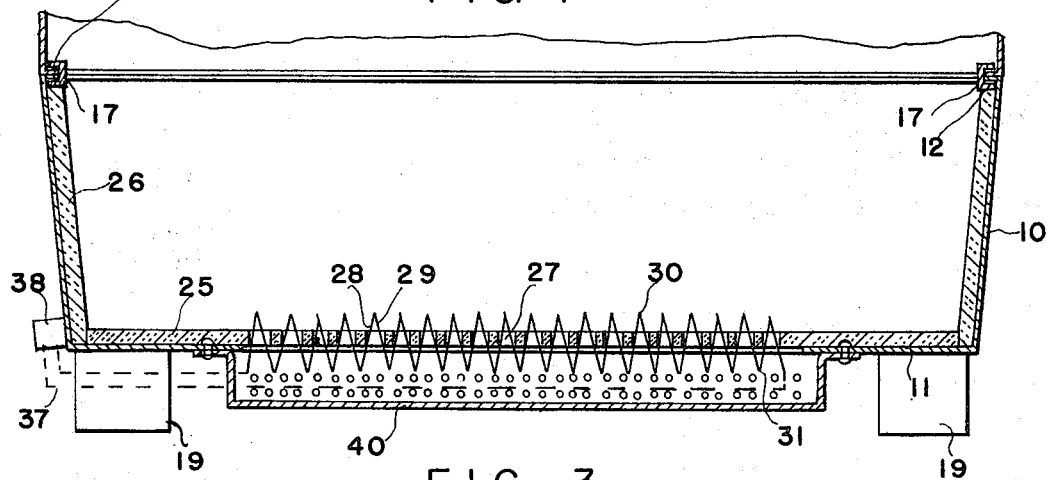
FIGURE 3 is a partial vertical sectional view of the apparatus of FIGURE 1.
Figure 2:
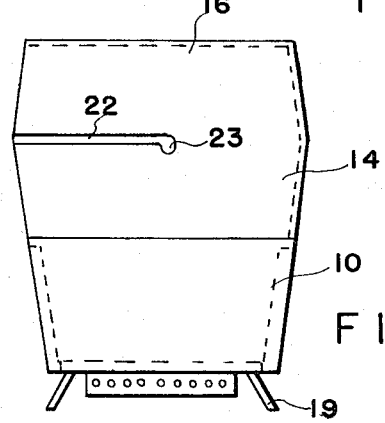
FIGURE 2 is a side elevation of the apparatus of FIGURE 1.

The parts described above are preferably made of aluminum sheet, and the top hood 14–16 is preferably made detachable so that the bottom tray or casing section 10–12 may be used by itself, if desired. For this latter purpose, I provide small channels 17 which interlock the injured flanges of both end walls 10 and 14 in the manner shown in FIGURE 3. The channels 17 are so dimensioned and of such resilient material that they are retained on the flanges by frictional engagement but may readily be withdrawn therefrom when it is desired to remove the top hood. I also preferably provide a readily removable wire grid 18 which spans the inturned flanges 12 or 13 (depending on whether or not the upper hood 14–16 is used) and is detachably supported on these flanges. The whole assembly is supported on legs 19 which are suitably attached to the bottom wall of the tray 10.

Rigidly secured to the outer surface of one of the side walls 14 of the upper hood is a gear reduction assembly having a small electric driving motor 24 and a female output connection, not particularly shown, into which is adapted to be detachably received a pointed end of a spit rod 21. It will be understood, of course, that a suitable aperture will be formed in the side wall 14 to which the gearing 20 is attached to permit of this entry and removal of the point end of the spit rod. The opposite end of the rod 21 is provided with a suitable manipulating handle, as shown, and the end portion of the rod adjacent the handle can be moved into its operating position along the slot 22 and into the depression 23, both formed in the adjacent side wall of the hood structure. This described detachable supporting arrangement for the spit is conventional in the art and need not be further described.

The motor 24 is of the miniature type commonly used to power miniature toys and, as such, has a permanent field magnet and a wound rotor which is commutator-controlled for D.C. operation. These motors are commonly energized by two miniature dry cells and while their torque output is rather low they have fairly high speed. The substantial reduction provided by gearing 20 establishes sufficient torque to rotate the rod 21 at the desired slow speed even when rather heavily loaded with the food to be barbecued.

In accordance with the principles of this invention, the motor 24 is arranged to be energized by a thermoelectric generator built into the base tray 10 and which is arranged to receive its necessary heat from the glowing coals of the charcoal bed which is built up in the base tray 10. For this purpose, the bottom wall 11 of the tray 10 is fitted with an overlying heat-insulating plate 25 which may, for example, be a one-half inch thickness of compressed asbestos board. The side walls of the tray 10 are protected on their inner surfaces by plates 26 of a similar material.

The center portion of the bottom insulating plate 25 is formed with a multiplicity of evenly but closely spaced apertures 27 to receive the thermocouples of the generator. The couples, numbering well over a hundred in a representative embodiment, are connected in series to generate an adequate voltage for the motor 24, and each couple consists of two short lengths 28 and 29 of wire made of dissimilar metals. Thus, the lengths 28 may be made of iron wire having a fairly high degree of purity while the lengths 29 are made of constantan wire having a high percentage of nickel. One of the sets of meeting ends of these short wire lengths are welded together to form hot junctions 30 while the other sets of ends are welded together to form the cold junctions 31. In actual practice, the jointings are made in the wire lengths separate from any association with the plate 25, the joining being accomplished in zig-zag fashion. Thereafter the joined assembly is simply applied to the plate 25 with one hot junction 30 extending up through one of the apertures 27. In actual practice, the openings 27 are relatively smaller in proportion than shown in FIGURE 3 so that the couples remain tightly wedged and retained in the apertures 27. However, and if desired, the apertures 30 may be plugged, after installation of the couples, with a cementitious mixture of suitable electrical and heat insulating material which upon hardening more thoroughly locks the couples in position.

Enclosing the cold junctions 31 of the generator is a cover 40 which is made of expanded or perforated sheet which allows full circulation of cooling air about these cold junctions. By keeping the junctions 31 cooled, the development of counter-EMF is at a minimum, allowing the hot junctions to develop and accumulative potential in the most efficient manner.

The output of the generator is conveyed by insulating conductors 37 to a receptacle 38 into which a pronged plug may be detachably inserted for conveying the current to motor 24 through conductors 39. In this manner, the top hood or cover of the assembly including the motor and gearing may be readily detached completely from the bottom tray 10, allowing this bottom tray to be used as a simple receptacle for glowing charcoal. In such case, the grid 18 will be used to support the objects to be cooked—for example the broiling of steaks.

It should now be apparent that I have provided a self-energizing grill and spit combination which accomplishes the objects initially set out. The assembly is very simple in design and is most economical to produce, and thus provides in a practical manner a portable grill or barbecue unit having a power-driven spit which is entirely operative without connection to any external power source. It should be understood that in actual use the tray 10 is at least partially filled with charcoal pellets which are ignited with the aid of any suitable starting fluid. In a short time, the heat of the glowing charcoal drives downwardly to heat up the hot junctions 30 thereby initiating the generation of electrical current for the powering of motor 24. I have found that glowing charcoal can rest directly on the hot junctions 30 without deleterious effects since in the absence of an air blast the temperatures do not rise into the plastic range of the wires 28 and 29 and of the welds therebetween.

Having thus describing my invention, what I claim is:

1. A portable grill comprising a deep sheet-metal tray having side walls and a bottom wall and constituting a fire basket for the reception of glowing charcoal, the side walls of said basket being lined on the inside with a fire resistant and heat insulating sheet, an enlarged aperture in the sheet metal of the bottom wall of said basket and spanned by said sheet which sheet is at least at this location also electrically insulating, a horizontally and rotatably supported spit located over the upper open end of said tray, an electrical motor and a speed reducing drive connected to the output shaft thereof for slowly rotating the spit, said sheet at said location being provided with a multiplicity of closely spaced apertures, and a multiplicity of serially connected thermocouples projecting through said apertures and held therein and having hot junctions positioned within said basket and cold junctions positioned outside said basket, a ventilating cover secured to the outer surface of a sheet-metal wall of said tray and enclosing said cold junctions, and means to conduct electric current from said thermocouples to said motor.

2. Apparatus according to claim 1 further characterized in that said spit is rotatably mounted in a hood detachably connected to the top of said tray, and said means to conduct comprising an electrical receptacle mounted on said tray and electrically connected with said thermocouples, said motor being equipped with a supply cord having a plug adapted to have detachable interconnection with said receptacle.

References Cited by the Examiner

UNITED STATES PATENTS

| | | | |
|---|---|---|---|
| 781,288 | 1/1905 | Marsh | 136—6 |
| 2,126,656 | 8/1938 | Pack | 136—4 |
| 2,815,707 | 12/1957 | Morrow | 99—421 |
| 3,106,150 | 10/1963 | Gaeke | 99—421 X |
| 3,113,504 | 12/1963 | Reed | 99—421 |
| 3,129,653 | 4/1964 | Kertesz | 99—421 |

FOREIGN PATENTS 58  1/1875  Great Britain.

WALTER A. SCHEEL, *Primary Examiner.*

IRVING BENEVICH, *Examiner.*

S. P. FISHER, *Assistant Examiner.*